United States Patent
Okamoto et al.

[11] Patent Number: 6,136,074
[45] Date of Patent: Oct. 24, 2000

[54] AIR CONDITIONING APPARATUS WITH AN AIR CLEANING FUNCTION AND ELECTRIC DUST COLLECTOR FOR USE IN THE SAME

[75] Inventors: Yoshikatsu Okamoto; Yoshiaki Ikuzawa; Akinori Okazaki; Takao Sakaue, all of Osaka, Japan

[73] Assignee: Funai Electric Co., Ltd., Tokyo, Japan

[21] Appl. No.: 09/432,574

[22] Filed: Nov. 12, 1999

Related U.S. Application Data

[62] Division of application No. 09/099,194, Jun. 18, 1998.

[30] Foreign Application Priority Data

| Jun. 18, 1997 | [JP] | Japan | 9-161161 |
| Jun. 18, 1997 | [JP] | Japan | 9-161162 |
| Aug. 20, 1997 | [JP] | Japan | 9-7394 |

[51] Int. Cl.$^7$ ........................................... B03C 3/36
[52] U.S. Cl. ............................. 96/62; 95/78; 96/63
[58] Field of Search ......................... 96/96–98, 28, 96/63, 74, 25, 399–407, 60, 62; 95/73, 74, 78; 55/282.3, DIG. 10

[56] References Cited

U.S. PATENT DOCUMENTS

| 2,746,831 | 5/1956 | Chapman | 95/74 X |
| 2,825,102 | 3/1958 | Hicks et al. | 95/73 X |
| 3,768,258 | 10/1973 | Smith et al. | 96/97 X |
| 3,800,505 | 4/1974 | Tarves, Jr. | 95/73 X |
| 3,807,137 | 4/1974 | Romell | 95/73 X |
| 3,907,520 | 9/1975 | Huang et al. | 95/73 X |
| 5,183,480 | 2/1993 | Raterman et al. | 95/74 |
| 5,290,343 | 3/1994 | Morita et al. | 96/96 X |
| 5,407,469 | 4/1995 | Sun | 96/97 X |
| 5,429,649 | 7/1995 | Robin | 96/405 |
| 5,454,859 | 10/1995 | Chiba et al. | 96/63 X |
| 5,518,531 | 5/1996 | Joannu | 96/97 X |
| 5,980,614 | 11/1999 | Loreth et al. | 96/96 X |

FOREIGN PATENT DOCUMENTS

| 2405528 | 8/1974 | Germany | 96/96 |
| 61-35907 | 8/1986 | Japan . | |
| 64-28427 | 1/1989 | Japan . | |

*Primary Examiner*—Richard L. Chiesa
*Attorney, Agent, or Firm*—Morgan, Lewis & Bockius LLP

[57] ABSTRACT

An air conditioning apparatus with an air cleaning function. In the apparatus, an electric dust collector is provided in the air passage on the rear side of a heat exchanger. A heater for self-cleaning is combined with a dust collector electrode of the electric dust collector. A heat shield plate is combined with the heater. Air flow resistance is not increased although the dust collector electrode is plane in shape. An increase of air flow resistance caused by the use of the heat shield plate is also suppressed.

2 Claims, 12 Drawing Sheets

AIR CONDITIONING APPARATUS WITH AN AIR CLEANING FUNCTION AND ELECTRIC DUST COLLECTOR FOR USE IN THE SAME

This is a divisional application Ser. No. 09/099,194 filed on Jun. 18, 1998.

BACKGROUND OF THE INVENTION

1. Field of the Invention

The present invention relates to an air conditioning apparatus with an air cleaning function, and an electric dust collector for use in the air conditioning apparatus.

2. Description of the Related Art

To enhance the function of an air conditioning apparatus, the recent technology in this field presents a proposal in which an electric dust collector is incorporated into the room unit of the air conditioning apparatus. As well known, the electric dust collector is constructed such that a high voltage is applied to between a discharge electrode and a dust collector electrode, and the discharge electrode ionizes dust particles contained in air around the electrode, and the ionized dust particles are electrostatically attracted to the dust collector electrode. When the electric dust collector thus constructed is incorporated into the room unit of the air conditioning apparatus, the air conditioning apparatus has an air cleaning function in addition to its air conditioning function.

In the air conditioning apparatus, the electric dust collector is usually located between the front grille and the heat exchanger located on the rear side of the front grille. In other words, it is located on the front side of the heat exchanger. To increase the dust collecting efficiency of the air conditioning apparatus in which the electric dust collector is located in front of the heat exchanger, a conventional technique collects dust particles while flowing air upward in zig-zag fashion in front of the heat exchanger (Japanese Patent Unexamined Publication No. Sho. 64-28427).

On the other hand, for the cleaning of the dust collector electrode, which frequently gives rise to trouble in the electric dust collector, unique techniques have been proposed. For example, an electric dust collector of a maintenance-free type has been developed in which a heater is attached to the dust collector electrode, and dust particulate matter sticking to the electrode is burnt by the heater.

By the way, a basic structure of the electric dust collector includes the combination of a linear discharge electrode and a plate-like dust collector electrode. The structure of the conventional air conditioning apparatus in which the electric dust collector is mounted in front of the heat exchanger is disadvantageous in that the electrodes of the dust collector, particularly the plate-like dust collector electrode, hinders the attraction of air to the heat exchanger, to thereby degrade the air conditioning function, or the function inherent in the air conditioning apparatus.

That is, in this type of the air conditioning apparatus, the plate-like dust collector electrode is usually disposed above the linear discharge electrode, and along the surface of the heat exchanger. There are at least two reasons why the plate-like dust collector electrode is disposed along the surface of the heat exchanger. The first reason is to avoid an increase of the depth of the air conditioning apparatus. The second reason is to avoid such a situation that when the air conditioning apparatus carries out an air cleaning operation by weak ion stream during the rest of its air conditioning operation, the plate-like dust collector electrode hinders a smooth flow of the weak ion stream. However, the structure in which the plate-like dust collector electrode is disposed along the surface of the heat exchanger, hinders the air attraction to the heat exchanger, to thereby degrade the air conditioning function of the air conditioning apparatus.

The degradation of the air conditioning function becomes marked in the electric dust collector of the maintenance-free type in which the heater is attached to the dust collector electrode. That is, it is a common practice that the heater is used in combination with a heat shield plate or the like, in the electric dust collector of the maintenance-free type. This heater structure additionally increases an air flow resistance that is caused by the electric dust collector, and hence further impedes the attraction of air to the heat exchanger. It is for this reason that the degradation of the air conditioning function is marked in this type of the electric dust collector.

This degradation problem, which arises from the increase of the air flow resistance will be present highly probably, also in the air conditioning apparatus of the type which collects dust particles while flowing air upward in zig-zag fashion in front of the heat exchanger (Japanese Patent Unexamined Publication No. Sho. 64-28427).

Further, a periodical cleaning is required for the conventional electric dust collector to ensure its dust collecting capability. The user may clean the electric dust collector in a manner that he opens the front panel of the air conditioning apparatus and makes access to the dust collector. This cleaning style needs troublesome work.

Furthermore, another problem which will arise in designing this type of the air conditioning apparatus is how to efficiently move the dust particles contained in air flowing through the air passage toward the dust collector electrode by the utilization of electrostatic force. The ionized dust particles, which fail to stick to the dust collector electrode, will stick to an air outlet of the casing and its near portion. The dust particulate matter sticks to the flap, for example, and the flap will appear markedly dirty. Dust lumps sticking to the inside of the casing is stripped therefrom by a blow by the fan, and discharged outside through the air outlet, and floats in the room.

SUMMARY OF THE INVENTION

Accordingly, an object of the present invention is to provide an air conditioning apparatus with an air cleaning function which is free from the degradation problem of the air conditioning function arising from the use of an electric dust collector, and efficiently reduces an increase of the air flow resistance even if the electric dust collector used is of the maintenance-free type, whereby an enhanced air conditioning function is secured.

Another object of the present invention is to provide an electric dust collector for use in the above air conditioning apparatus.

Still another object of the present invention is to provide an air conditioning apparatus with a dust collector being improved such that a periodical cleaning is not required, and a stable dust collecting function is secured.

A further object of the present invention is to provide a recording medium used for the above air conditioning apparatus.

A further object of the present invention is to provide an air conditioning apparatus which enables dust particles to efficiently stick to the dust collector electrode and others.

The present invention provides an air conditioning apparatus with an air cleaning function, comprising: a heat exchanger; a casing whose inner space is partitioned by the heat exchanger, one side of the partitioned inner space including an air inlet and an incoming air passage while the other side thereof including an air outlet and an outgoing air passage; an air discharging fan provided in the outgoing air passage; and an electric dust collector provided in the outgoing air passage and including a combination of a discharge electrode and a dust collector electrode, wherein dust particles contained in air that is introduced through the air inlet and passes through the heat exchanger are charged by a discharge taking place between the discharge electrode and the dust collector electrode, and the charged dust particles are electrostatically attracted to the dust collector electrode.

Further, the present invention provides an air conditioning apparatus with an air cleaning function, comprising: a casing of which at least the front side includes an air inlet formed and an air outlet located below the air inlet; a heat exchanger disposed within the casing while being confronted with the air inlet of the casing; a fan for introducing air through the air inlet, making it pass through the heat exchanger, and discharging it through the air outlet; and an electric dust collector in which dust particles contained in air passing through the heat exchanger are charged by corona discharge and are electrostatically attracted to a dust collector electrode, the electric dust collector being provided between a rear side of the heat exchanger and an inner wall of the casing.

Further, the present invention provides an air conditioning apparatus with an electric dust collector which develops a coulomb force between a discharge electrode and a dust collector electrode disposed in an air passage, and ionizes dust particles contained in air flowing through the air passage to cause the ionized dust particles to stick to the dust collector electrode by the coulomb force, wherein the discharge electrode is located deviated to the windward of streams of air flowing through the air passage.

Further, the present invention provides an electric dust collector used for an air conditioning apparatus with an air cleaning function, comprising: a combination of a discharge electrode and a dust collector electrode for causing a corona discharge therebetween to make dust particles electrostatically attract to the dust collector electrode by coulomb force; a heater for burning or thermally decomposing the dust particles attracted to the dust collector electrode; and a heat shield plate for shielding heat from the heater, the heat shield plate also serving as a mounting plate on which the discharge electrode, the dust collector electrode and the heater are mounted.

Further, the present invention provides an air conditioning apparatus with a dust collector which burns dust particles sticking to an electrode by a heat, the air conditioning apparatus comprising: means for counting an operation time of the air conditioning apparatus; and means for energizing the heater for a predetermined time when the counted operation time exceeds a preset time.

Furthermore, the present invention provides a recording medium having a program recorded therein for causing a computer contained in an air conditioning apparatus to control the apparatus, the apparatus being provided with a dust collector which burns dust particles sticking to an electrode thereof, wherein the program causes the computer to control the apparatus in a manner that an operating time of the apparatus is counted, and the heater is energized for a predetermined time when the counted operating time exceeds a preset time.

BRIEF DESCRIPTION OF THE DRAWINGS

FIGS. 12(a) and 12(b) are diagrams for explaining the principle of sticking of ionized dust particles to the dust collector electrode; FIG. 12(a) shows a case where the discharge electrode is disposed in front of the dust collector electrode, and FIG. 12(b) shows a case where the discharge electrode is disposed deviated to the windward side from a location in front of the dust collector electrode.

DETAILED DESCRIPTION OF THE PREFERRED EMBODIMENTS

Figure 1:
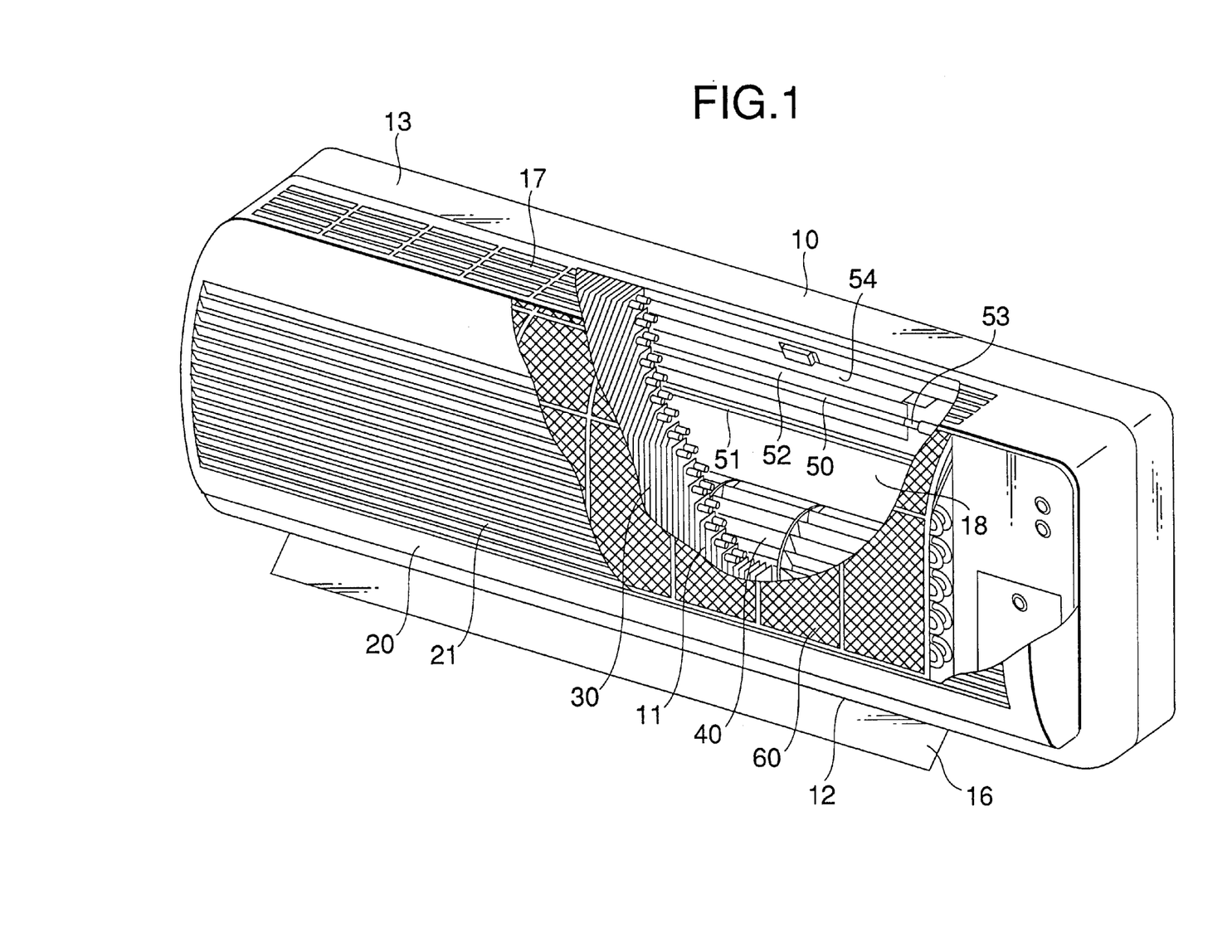
FIG. 1 is a perspective view, partly broken, showing an air conditioning apparatus with an air cleaning function, which is an embodiment of the present invention.
Figure 2:
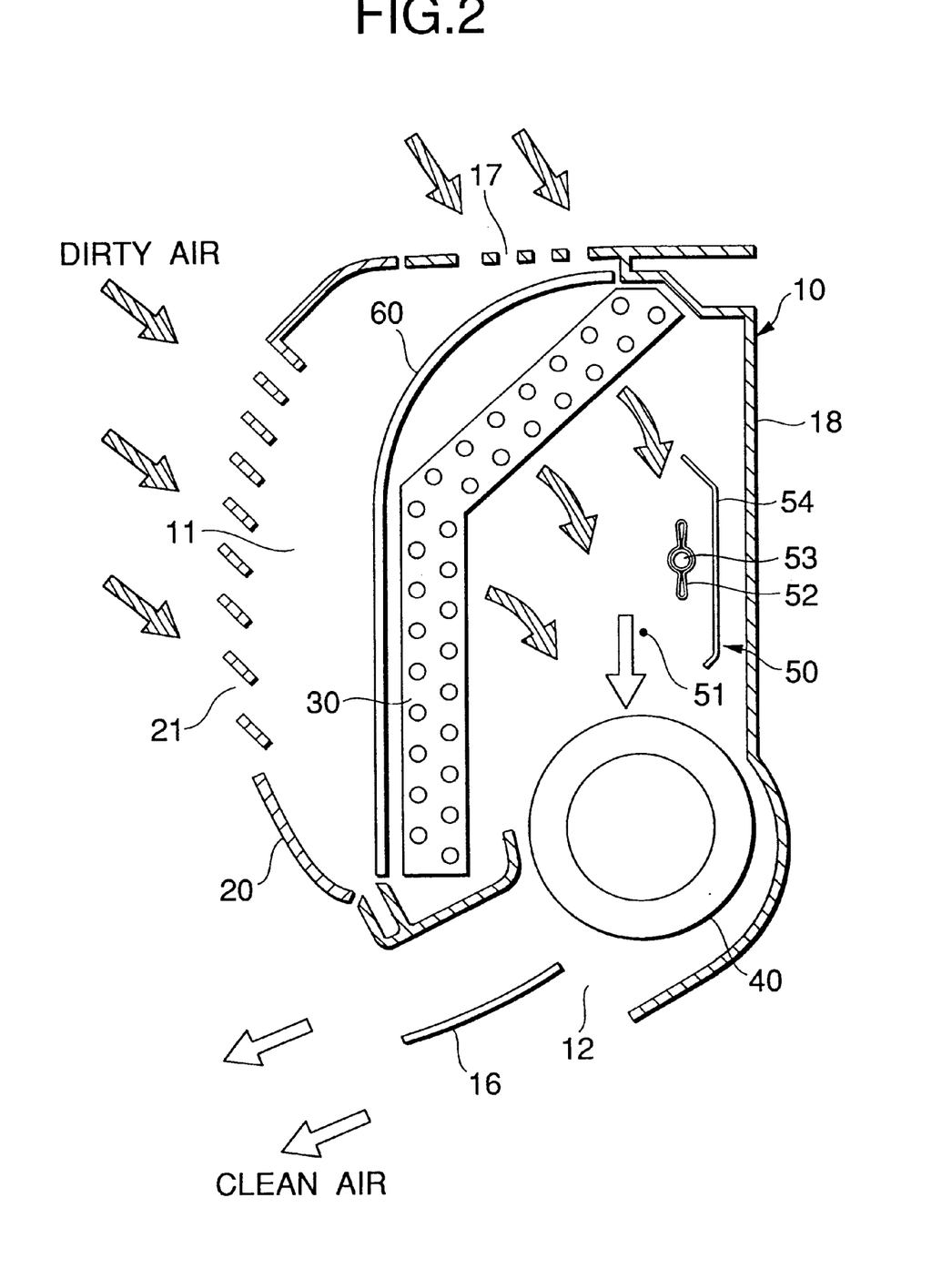
FIG. 2 is a side view showing a model of streams of air flowing within the air conditioning apparatus when the apparatus is operated in an air conditioning mode.
Figure 3:
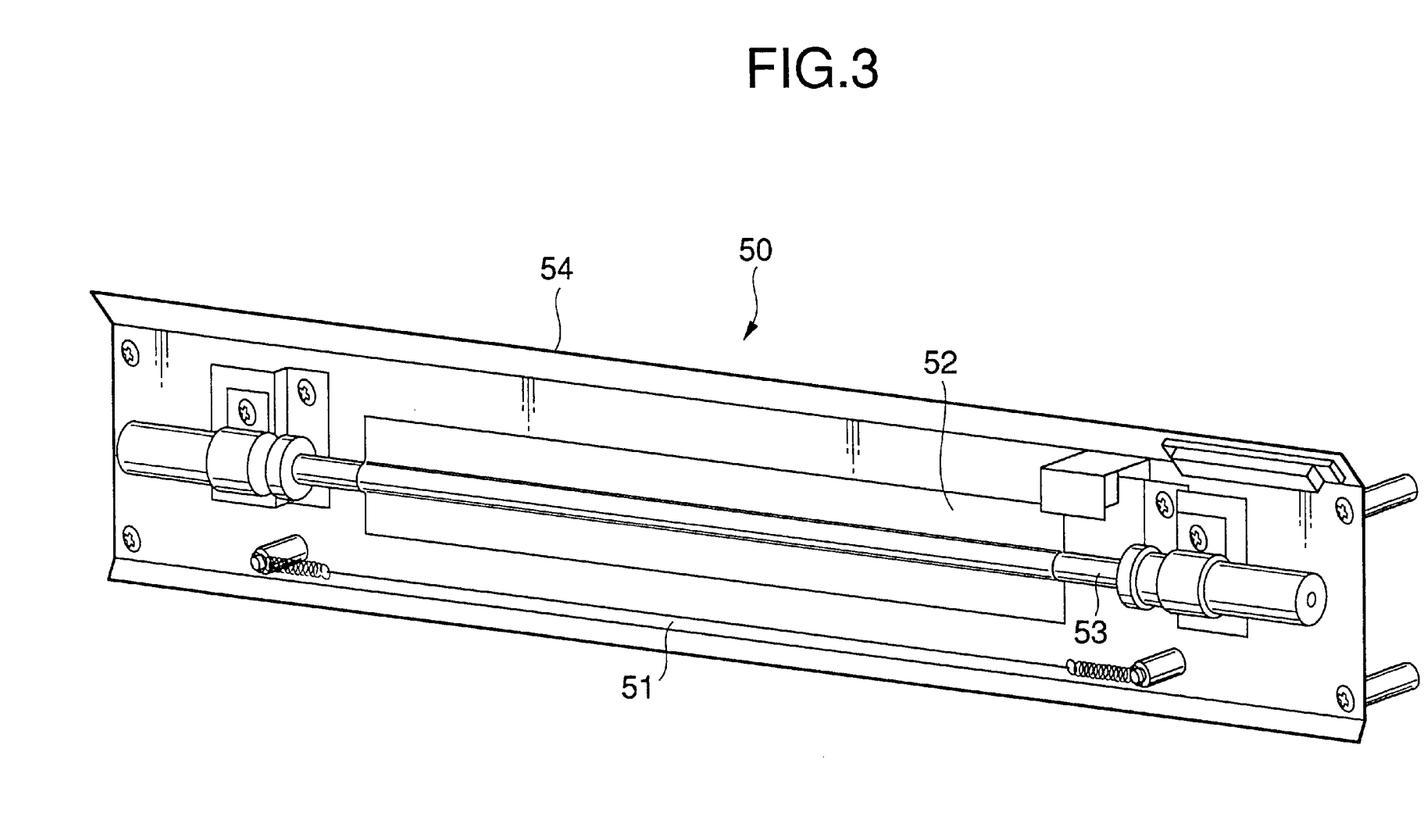
FIG. 3 is a perspective view showing an electric dust collector incorporated into the air conditioning apparatus.
Figure 4:
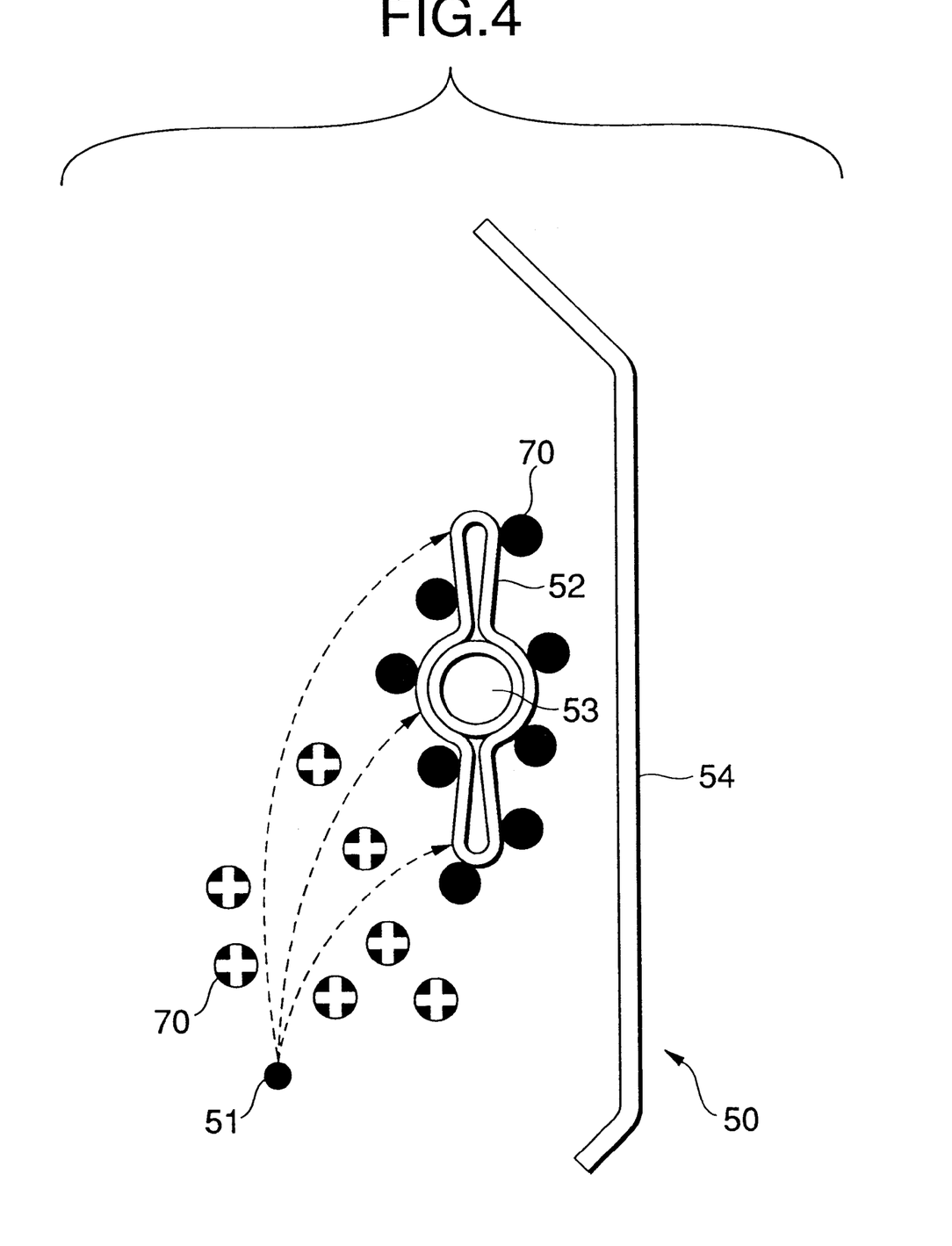
FIG. 4 is a diagram useful in explaining the dust-collecting principle employed in the electric dust collector.

The preferred embodiments of the present invention will be described in detail with reference to the accompanying drawings. FIG. 1 is a perspective view, partly broken, showing an air conditioning apparatus with an air cleaning function, which is an embodiment of the present invention. FIG. 2 is a side view showing a model of streams of air flowing within the air conditioning apparatus when the apparatus is operated in an air conditioning mode. FIG. 3 is a perspective view showing an electric dust collector incorporated into the air conditioning apparatus. FIG. 4 is a diagram useful in explaining the dust-collecting principle employed in the electric dust collector. In those figures, reference numeral 10 designates a casing; 11, an air inlet; 12, an air outlet; 13, an upper portion; 16, a louver; 17, an upper grille; 18, an inner wall; 20, a front case; 21, a front grille; 30, a heat exchanger; 40, a fan; 50, an electric dust collector; 51, a discharge electrode; 52, a dust collector electrode; 53, a heater; 54, a heat shield plate; 60, a filter; and 70, dust particles.

The air conditioning apparatus with an air cleaning function according to this embodiment is made up of the casing 10, front case 20, heat exchanger 30, fan 40, and electric dust collector 50 (FIGS. 1 and 2). The casing 10 has the air inlet 11 opened in the front side thereof and the air outlet 12 located under the air inlet 11. The front case 20 is attached to the air inlet 11 of the casing in a state that it may be opened. The heat exchanger 30 is disposed within the casing 10 while being confronted with the air inlet 11 of the casing 10. The fan 40, which is of the cross-flow type, is located at a more inner place than the air outlet 12. The fan 40 forcibly flows air from the air inlet 11 to the air outlet 12, through the heat exchanger 30. The electric dust collector 50, which is electronically controlled, is disposed on the rear side of the heat exchanger 30.

The casing 10 has the upper grille 17 formed in the upper portion 13. The front case 20 has the front grille 21 on the front side thereof. The louver 16, which is angularly adjustable, is provided along the air outlet 12 of the casing 10. The filter 60 is provided between the front case 20 and the heat exchanger 30.

The electric dust collector 50, which is disposed in the air passage on the rear side of the heat exchanger 30, is mounted on the vertical inner wall 18 of the casing 10. The electric dust collector 50 is formed with the discharge electrode 51, the dust collector electrode 52, and the heater (sheathing heater) 53 (FIGS. 3 and 4). The discharge electrode 51, which is linear in shape, is horizontally stretched. The dust collector electrode 52, which is shaped like an elongated plate, is disposed above and along the discharge electrode 51. The heater 53, which is shaped like a bar, is horizontally arranged. The heater 53 is provided for self-cleaning of the dust collector electrode 52. The dust collector electrode 52 is horizontally supported by the heater 53, while sandwiching the heater 53 therebetween. The discharge electrode 51 and the heater 53 are mounted on the front side of the heat shield plate 54. The heat shield plate 54 is mounted on the surface of the vertical inner wall 18 of the casing 10. The discharge electrode 51 and the heat shield plate 54 are arrayed along the air stream that flows from the upper side to the lower side on the rear side of the heat exchanger 30.

The electric dust collector 50 is located at a middle position or at a relatively upper position on the rear side of the heat exchanger 30. A dust attracting force of the electric dust collector 50 is stronger than an air suction force of the fan 40. To activate the burning and thermal decomposition of the dust particulate matter sticking to the surface of the dust collector electrode 52, the surface of the dust collector electrode 52 is coated with catalyst, such as aluminum oxide, zeolite and platinum.

The operation of the thus constructed air conditioning apparatus will be described.

When the air conditioning operation is performed, air is introduced, by the fan 40, into the casing 10 from the apparatus outside, through the front grille 21 of the front case 20 and the upper grille 17, as in the conventional apparatus. The introduced air passes through the heat exchanger 30, flows from the upper side to the lower side on the rear side, and goes out of the apparatus from the air outlet 12 through the fan 40.

In the electric dust collector 50 disposed on the rear side of the heat exchanger 30, a high voltage is applied to between the discharge electrode 51 and the dust collector electrode 52. Under the high voltage, electric lines of force (indicated by broken lines) are developed between the discharge electrode 51 and the dust collector electrode 52 as shown in FIG. 4. The dust particles 70 contained in air around the discharge electrode 51 are ionized, and attracted and stick to the dust collector electrode 52 by the coulomb force. The air after passing through the heat exchanger 30 is cleaned when passing the rear side of the heat exchanger 30, and discharged out of the air conditioning apparatus.

In the electric dust collector 50, the discharge electrode 51 and the heat shield plate 54 are arranged along the stream of air, which flows through the air passage on the rear side of the heat exchanger 30 from the upper side to the lower side. Further, the electric dust collector 50 is mounted on the vertical inner wall 18 of the casing 10, that is, it is located at the fringe of the air stream. With this construction, those components hardly hinder the air stream flowing from the upper side to the lower side on the rear side of the heat exchanger 30. Thus, the electric dust collector 50 of the maintenance-free type, having the combination of the heater 53 and the heat shield plate 54, is used; however, the use of the electric dust collector 50 does not degrade the air conditioning function of the apparatus in any way.

It is noted that the air conditioning apparatus has the following structure: the electric dust collector 50 is mounted on the surface of the vertical inner wall 18 of the casing 10, located at the outer fringe of the air stream, and located at the middle or relatively upper position on the rear side of the heat exchanger 30. With this structure, an air pressure acting on the electric dust collector 50 is small. Therefore, the dust attraction force of the electric dust collector 50 is much stronger than the air suction force by the fan 40, whereby a high air conditioning function is secured.

As the electric dust collector 50 is used continuously, dust particulate matter is accumulated on the surface of the dust collector electrode 52. By energizing the heater 53, the dust particles sticking to the dust collector electrode 52 are burned to be removed, so that the surface of the dust collector electrode 52 is cleaned. In this respect, the necessity of cleaning the dust collector electrode 52 is eliminated, that is, the dust collector electrode 52 is free of its maintenance. As already described, the surface of the dust collector electrode 52 is coated with catalyst, such as aluminum oxide, zeolite and platinum. Therefore, the dust particles sticking to the surface of the dust collector electrode 52 are thermally decomposed at a relatively low heating temperature of about 300° C. The result is to remarkably reduce the offensive smell given out at the time of dust removal.

Figure 5:
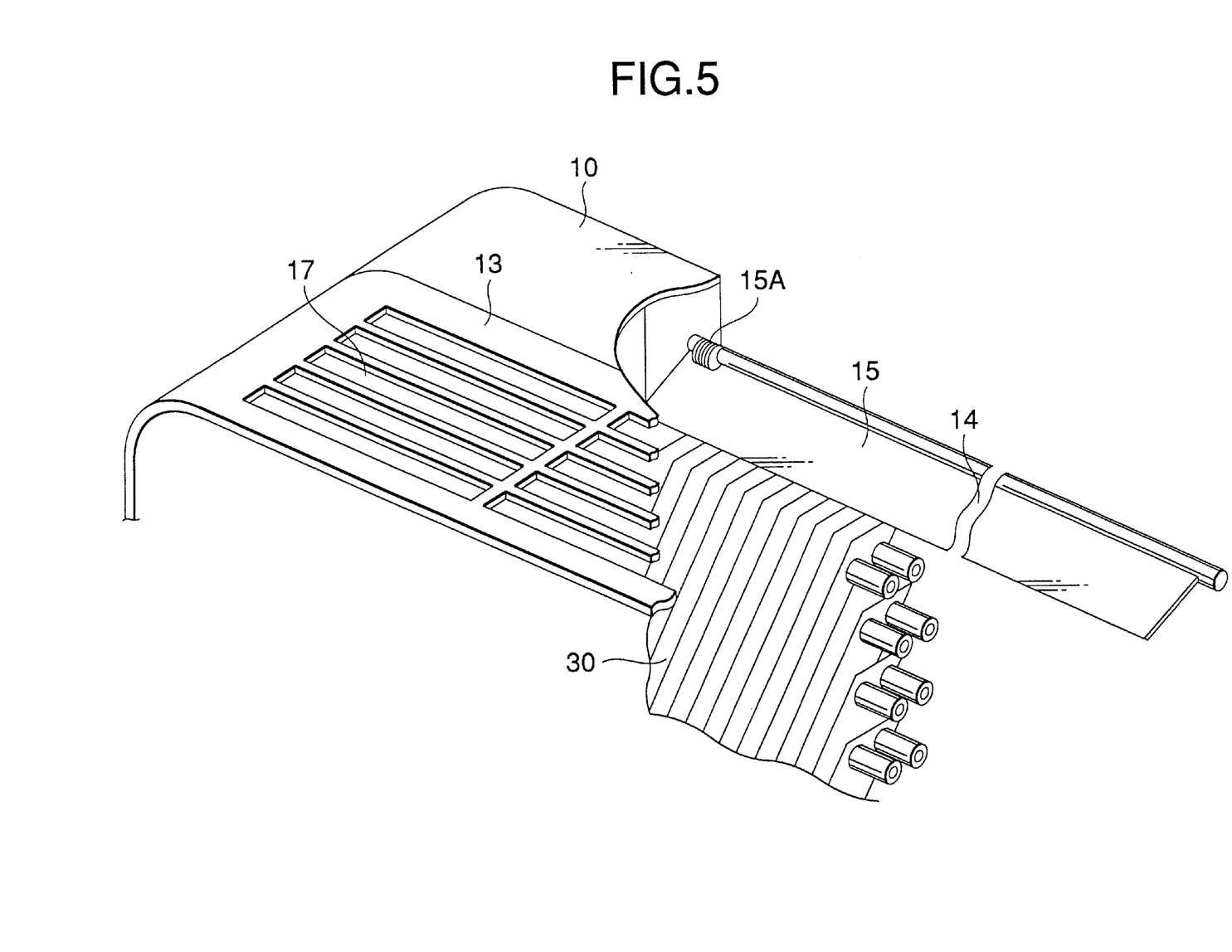
FIG. 5 is a perspective view, partly broken, showing a key upper portion of an air conditioning apparatus with an air cleaning function, which is another embodiment of the present invention.
Figure 6:
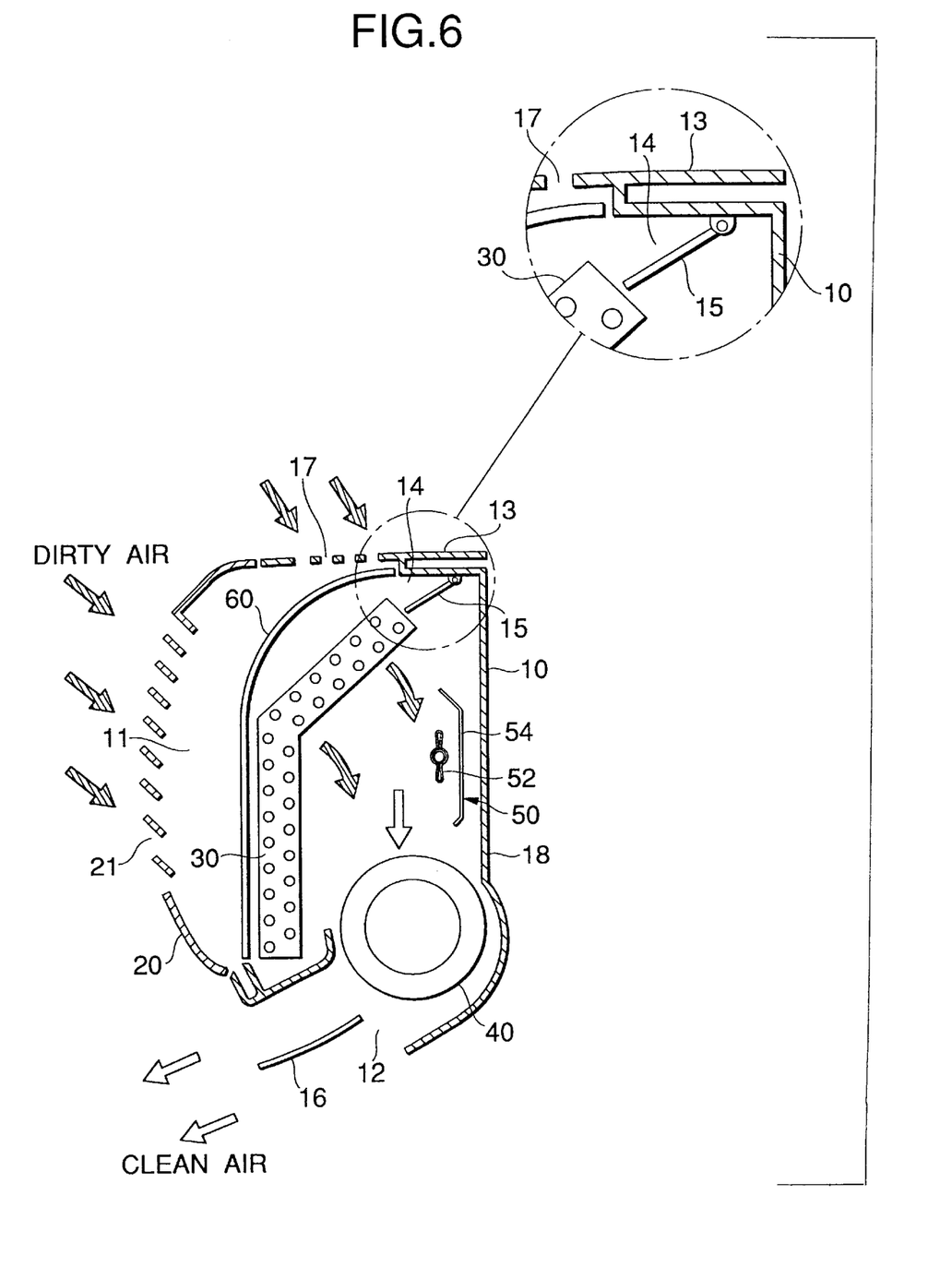
FIG. 6 is a side view showing a model of streams of air when the air conditioning apparatus is operated in an air conditioning mode.
Figure 7:
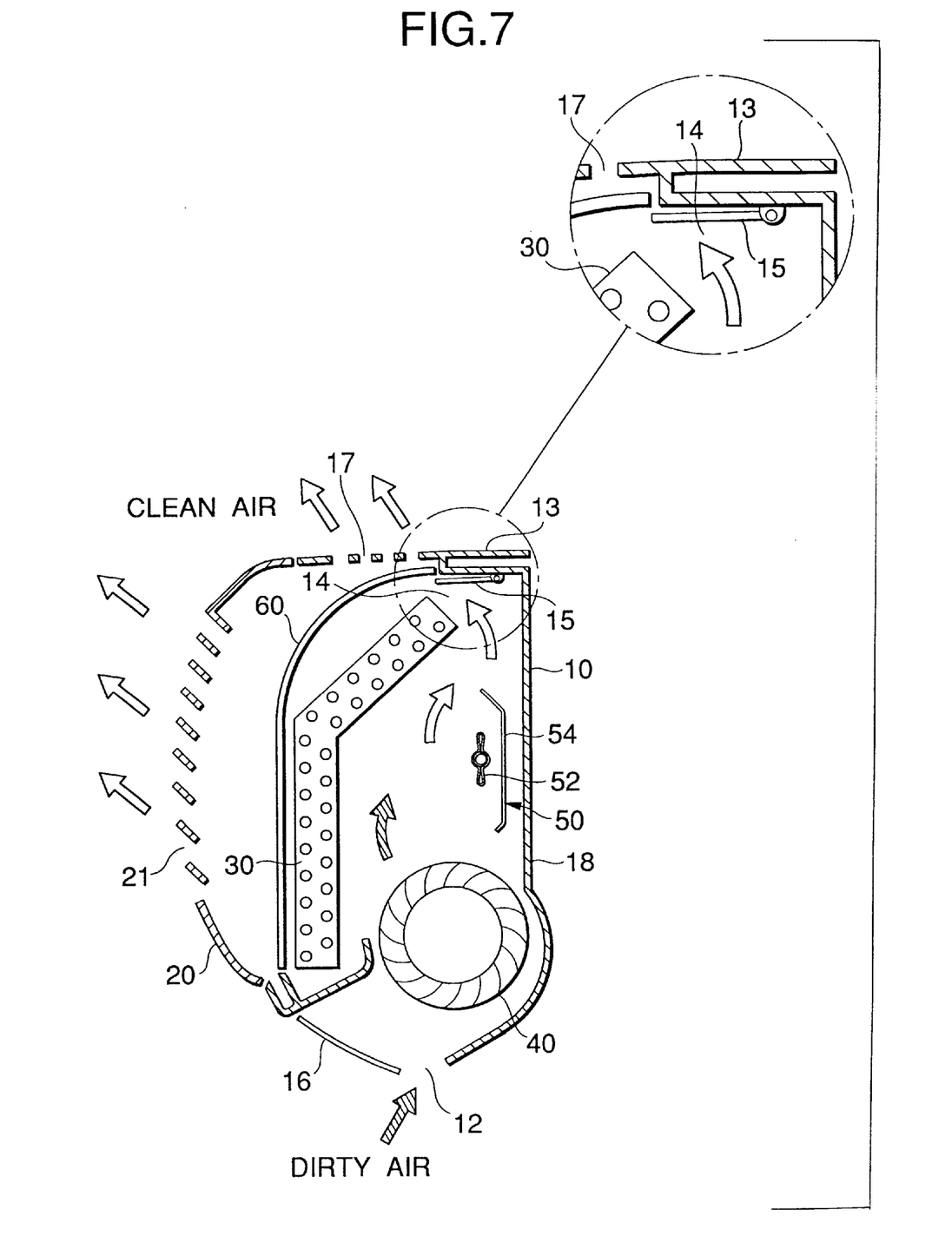
FIG. 7 is a side view showing a model of streams of air when the air conditioning apparatus is operated in an air cleaning mode during the stoppage of the air conditioning operation.

FIG. 5 is a perspective view, partly broken, showing a key upper portion of an air conditioning apparatus with an air cleaning function which is another embodiment of the present invention. FIG. 6 is a side view showing a model of streams of air when the air conditioning apparatus is operated for air conditioning. FIG. 7 is a side view showing a model of streams of air when the air conditioning apparatus, which has stopped its air conditioning, is operated for air cleaning.

In those figures, like reference numerals are used for designating like or equivalent portions in FIGS. 1 through 4, and the following numerals are additionally used: 14 designates a slit-like opening; 15, a valve of the damper type; and 15A, a spring.

In the air conditioning apparatus of the second embodiment, the slit-like opening 14, while extending over the entire width of the heat exchanger 30, is formed between the upper end of the heat exchanger 30 whose upper portion is slanted rearward, and the vertical inner wall 18 of the casing 10. The slit-like opening 14 sets up a communication of the space, which is present on the rear side of the heat exchanger 30, with exterior through the upper grille 17 of the casing 10. The valve 15 is provided in the slit-like opening 14. The valve 15 may be turned about its rear end. When the fan 40 is stopped, the valve 15 is urged upward by the spring 15A to open the slit-like opening 14. When the fan 40 operates and the air passage on the rear side of the heat exchanger 30 is placed at a negative pressure, the valve 15 is turned downward while resisting the urging force of the spring 15A, to thereby close the slit-like opening 14.

The remaining construction of the second embodiment is substantially the same as that of the first embodiment.

To operate the air conditioning apparatus in an air conditioning mode, the fan 40 is driven and the valve 15 is operated to close the slit-like opening 14 (FIG. 6). As a result, outside air is introduced into the casing 10, through the front grille 21 of the front case 20 and the upper grille 17. The air passes through the heat exchanger 30, and then it flows from the upper side to the lower side on the rear side of the heat exchanger 30. Then, it is discharged outside from the air outlet 12, through the fan 40.

In the electric dust collector 50 disposed in the air passage on the rear side of the heat exchanger 30, a high voltage is applied to between the discharge electrode 51 and the dust collector electrode 52. The dust particles 70 contained in air around the discharge electrode 51 are ionized, and attracted and stick to the dust collector electrode 52 by the coulomb force. The air after passing through the heat exchanger 30 is cleaned when passing the rear side of the heat exchanger 30, and discharged out of the air conditioning apparatus.

The electric dust collector 50 is constructed such that the discharge electrode 51 and the heat shield plate 54 are arranged along the air stream, which flows through the air passage on the rear side of the heat exchanger 30 from the upper side to the lower side, and further mounted on the vertical inner wall 18 of the casing 10 and located at the outer fringe of the air stream. With this construction, those components hardly hinder the air stream flowing from the upper side to the lower side on the rear side of the heat exchanger 30. Thus, the electric dust collector 50 of the maintenance-free type, having the combination of the heater 53 and the heat shield plate 54, is used; however, the use of the electric dust collector 50 does not degrade the air conditioning function of the apparatus in any way.

When the air conditioning apparatus is operated for air cleaning during the stoppage of the air conditioning operation, the fan 40 is stopped and a high voltage is applied to between the discharge electrode 51 and the dust collector electrode 52, which constitute the electric dust collector 50 (FIG. 7). When the fan 40 is stopped, the valve 15 is returned to its original position, to thereby open the slit-like opening 14. An ion stream is caused by the application of a high voltage to between the discharge electrode 51 and the dust collector electrode 52, and the ion stream flows from the upper side to the lower side. By the ion stream, air is introduced into the air passage on the rear side of the heat exchanger 30, through the air outlet 12. The dust particles contained in the introduced air are removed by the electric dust collector 50. The air thus cleaned is discharged outside through the slit-like opening 14 and the upper grille 17 of the casing 10. Thus, the air conditioning apparatus functions as an air cleaner.

In the electric dust collector 50, the discharge electrode 51 and the heat shield plate 54 are arranged along the air stream, which flows through the air passage on the rear side of the heat exchanger 30 from the upper side to the lower side. Further, the electric dust collector 50 is mounted on the surface of the vertical inner wall 18 of the casing 10 and located at the outer fringe of the air stream. With this construction, those components hardly hinder the air stream flowing from the upper side to the lower side on the rear side of the heat exchanger 30. Therefore, provision of the electric dust collector 50 does not degrade the air cleaning function of the apparatus in any way.

The slit-like opening 14 is located above the air passage on the rear side of the heat exchanger 30. Therefore, the slit-like opening 14 may utilize the upper grille 17 of the casing 10. For this reason, an air flow resistance is considerably small when the air conditioning apparatus is operated for air cleaning during the stoppage of the air conditioning operation. Also in this respect, the air cleaning function of the air conditioning apparatus is good.

As the electric dust collector 50 is used continuously, dust particles are accumulated on the surface of the dust collector electrode 52. By energizing the heater 53, the dust particles sticking to the dust collector electrode 52 are burned to be removed, so that the surface of the dust collector electrode 52 is cleaned. In this respect, the necessity of cleaning the dust collector electrode 52 is eliminated, that is, the dust collector electrode 52 is free of its maintenance.

When the air conditioning apparatus is operated for air cleaning during the stoppage of the air conditioning operation, the louver 16 of the angular adjusting type is closed, but the air outlet 12 of the casing 10 is not perfectly closed. Therefore, an increase of the air flow resistance by the louver 16 is small. When the increase of the air flow resistance is problematic, the louver 16 may be opened when the air conditioning apparatus is operated, for air cleaning.

On the other hand, in the air conditioning mode, air flows through the air passage on the rear side of the heat exchanger 30 in the direction opposite to that of ion stream generated by the electric dust collector 50. In case where the degradation of the air cleaning function by this phenomenon becomes problematic, the problem may be solved in such a simple manner that the discharge electrode 51 and the dust collector electrode 52 are vertically oriented, and arranged side by side in the widthwise direction of the casing 10, and the dust collector electrode 52 consists of a fin like member which is vertically raised from the inner wall 18 of the casing 10.

In the above-described embodiment, the slit-like opening 14 is located above the air passage on the rear side of the heat exchanger 30. However, the slit-like opening 14 may be provided in the vertical inner wall 18 of the casing 10 if it is located above the electric dust collector 50.

The valve 15 for opening and closing the slit-like opening 14 is of the damper type using the spring 15A in the above-described embodiment. In an alternative, the valve 15 may be turned forcibly by use of a motor, if required.

The heater 53 for cleaning the dust collector electrode 52 is in contact with the dust collector electrode 52 in the above-described embodiments. If required, the heater 53 may be located separately from but close to the dust collector electrode 52.

The surface of the dust collector electrode 52 is coated with the catalyst for activating the burning of dust particles. The dust collector electrode 52 per se may be formed of the catalyst.

As seen from the foregoing description, in an air conditioning apparatus with an air cleaning function according to the present invention, the electric dust collector is provided in the air passage on the rear side of the heat exchanger. The provision of the electric dust collector produces no increase of air flow resistance when the air conditioning apparatus is operated in an air conditioning mode. In this respect, the air conditioning function is enhanced. Also in case where the electric dust collector of the maintenance-free type in which the heater is coupled into the dust collector electrode is used, the use of the electric dust collector gives rise to no increase of air flow resistance, thereby securing satisfactory air conditioning function. Further, there is eliminated the problem of dirt formed on the front casing by floating ionized dust particles.

Furthermore, in the air conditioning apparatus, the electric dust collector is equipped with the heater and the heat shield plate. Therefore, good maintenance is retained although the electric dust collector is located on the rear side of the heat exchanger, and the casing and the wall surface of the casing are hardly deteriorated by heat.

Figure 8:
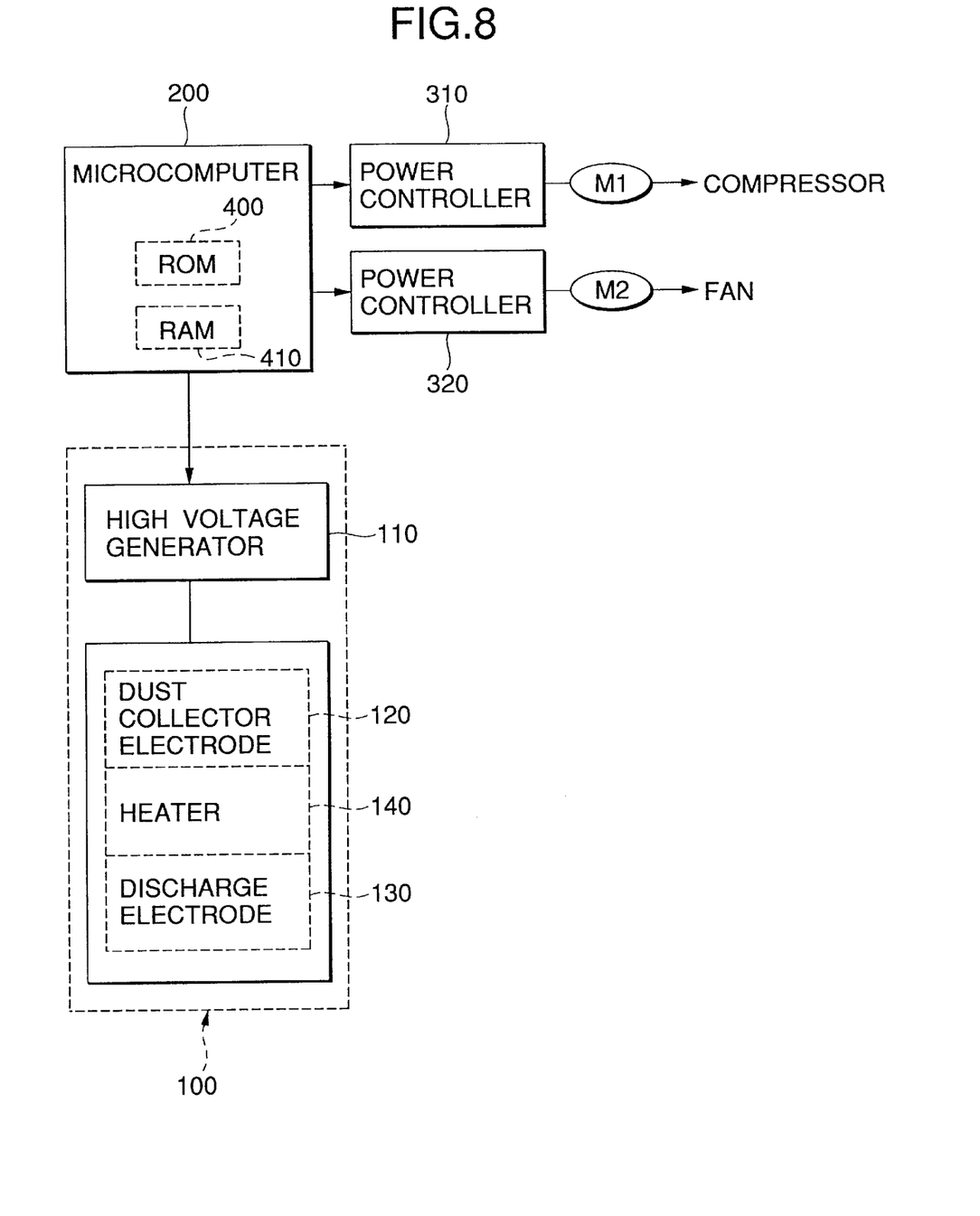
FIG. 8 is a block diagram showing an air conditioning apparatus with an electric dust collector, which is still another embodiment of the present invention.
Figure 9:
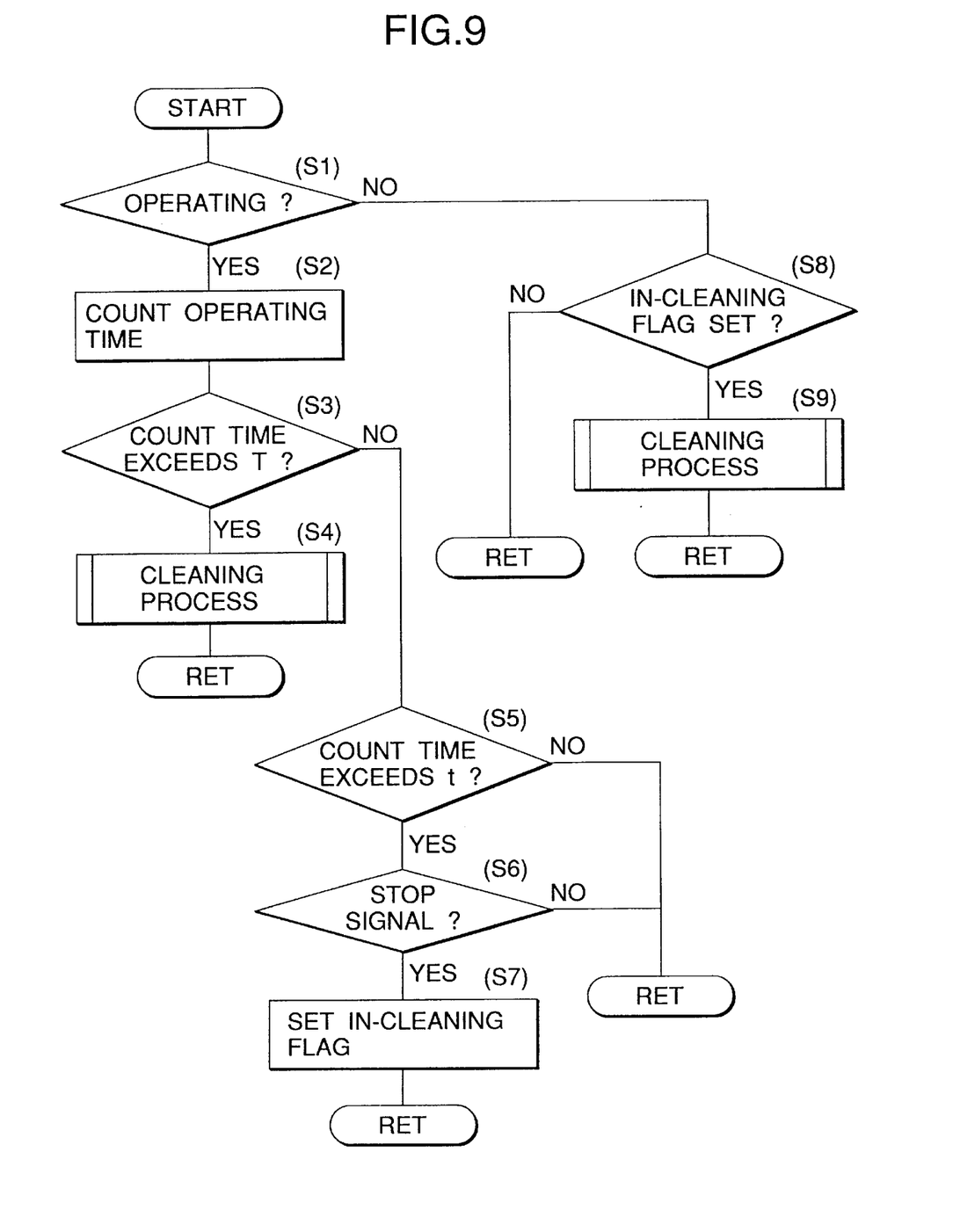
FIG. 9 is a flow chart showing a program to be executed by a microcomputer contained in the air conditioning apparatus.
Figure 10:
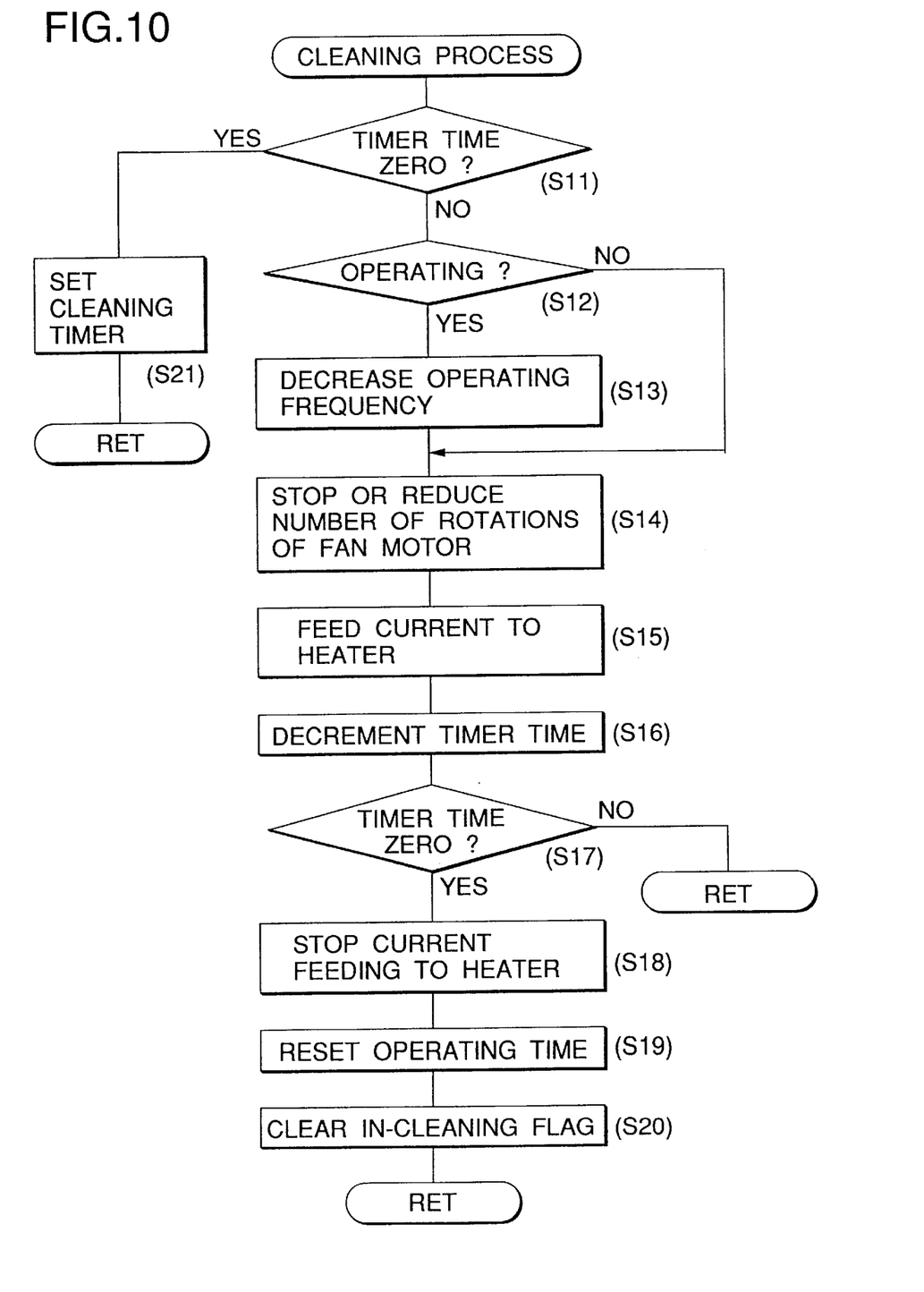
FIG. 10 is a flow chart showing another program to be executed by the microcomputer.

Next, an air conditioning apparatus with a dust collector and a recording medium, according to still another embodiment of the present invention, will be described with reference to FIGS. 8 through 10. FIG. 8 is a block diagram showing the air conditioning apparatus. FIG. 9 is a flow chart showing a program to be executed by a microcomputer contained in the air conditioning apparatus. FIG. 10 is a flow chart showing another program to be executed by the microcomputer. In those figures, reference numeral 100 designates an electric dust collector; 110, a high voltage generator; 120, a dust collector electrode; 130, a discharge electrode; 140, a heater; 200, a microcomputer; 310, a power controller; 320, another power controller; 400, a ROM; and 410, a RAM. Further, reference character M1 designates a compressor motor; and M2, a fan motor.

The air conditioning apparatus to be described hereinafter is an air conditioner of the invertor type as shown in FIG. 8. The air conditioner is generally made up of the electric dust collector 100 and the microcomputer 200 for controlling the operation of an overall system of the air conditioner containing the electric dust collector 100.

The electric dust collector 100 is made up of the plate-like dust collector electrode 120, the linear discharge electrode 130, the high voltage generator 110 for generating a high voltage, which is applied to between the electrodes 120 and 130 oppositely arranged, and the heater 140 embedded in the dust collector electrode 120. The dust collector electrode 120 and the discharge electrode 130 are disposed on the rear side of a heat exchanger (not shown). A high voltage is applied to between the dust collector electrode 120 and the discharge electrode 130, from the high voltage generator 110. By the application of the high voltage, a high electric field is generated between those electrodes. Under the electric field, the dust particles contained in air introduced by the fan motor M2 to be described later are ionized and stick to the dust collector electrode 120, for example. The dust particles sticking to the dust collector electrode 120 are burned by the heater 140 when it is energized.

The output port of the microcomputer 200 is connected to the compressor motor M1 and the fan motor M2 respectively through the power controllers 310 and 320, and further to the electric dust collector 100.

The microcomputer 200 includes the ROM 400 as a recording medium. A program for controlling the compressor motor M1, fan motor M2 and electric dust collector 100 is stored in advance in the ROM 400.

Next, the contents of the program to be executed by the microcomputer 200, and the air-conditioning operation of the air conditioner will be described with reference to FIGS. 9 and 10.

To start, the microcomputer 200, specifically the CPU contained therein, judges whether or not the air conditioning apparatus is operating (step S1). If the answer is YES, the CPU counts an operating time of the air conditioning apparatus (step S2). Specifically, data on the operating time, or the count time, is stored in the RAM 410 of the microcomputer 200. Every time the process of step S2 is carried out, a basic unit time, e.g., 10 minutes, is added to the data stored.

Next, the CPU judges whether or not the count time exceeds a first preset time T (step S3). With the operation of the air conditioner, dust particulate matter sticking to the dust collector electrode 120 of the electric dust collector 100 increases in amount, and the dust collecting function of the electric dust collector 100 decreases in its dust collecting ability. The first preset time T is set at a critical time point where the dust collecting ability of the electric dust collector 100 starts to remarkably reduce. In this instance, the first preset time T is set to be 10 hours.

If the count time exceeds the first preset time T, the CPU carries out a cleaning process to the electric dust collector 100 (step S4). This process will be described in detail later. Upon the end of the cleaning process, the CPU returns to step S1.

On the other hand, if the count time is below the first preset time T, the CPU judges whether or not the count time exceeds another or second preset time t (step S5). In this instance, the second preset time t is set to be smaller than the first preset time T. Also in this instance, the second preset time t is set to be 8 hours as an operating time at which the cleaning of the electric dust collector 100 is desirable.

If the count time exceeds the second preset time t, the CPU judges whether or not a stop signal stored in the RAM 410 of the microcomputer 200 is in an on-state (step S6). Here, the stop signal is input to and stored into the RAM 410 by a remote controller attached to the air conditioning apparatus. The stop signal indicates whether or not the electric dust collector 100 is to be cleaned after the end of the operation of the air conditioning apparatus, that is, it sets up a feed/stop of current to the heater.

If the stop signal is in an off-state, that is, the electric dust collector 100 is to be cleaned after the end of the air conditioning operation, the CPU sets an in-cleaning flag in the RAM 410 thereof (step S7). Thereafter, the CPU returns to step S1. On the other hand, if the stop signal is in an on-state, that is, the cleaning process for the electric dust collector 100 is not to be carried out after the end of the air conditioning operation, the CPU does not set the in-cleaning flag and returns to step S1.

If the count time, or the operating time, is below the second preset time t, the CPU returns to step S1. The subsequent processes are executed as described above. However, when the operation of the air conditioner ends (step S1), the CPU judges whether or not the in-cleaning flag is set (step S8).

If the in-cleaning flag is set, the CPU carries out the process of cleaning the electric dust collector 100 (step S9). When the cleaning of the electric dust collector 100 ends, the CPU returns to step S1. On the other hand, when the in-cleaning flag is not set, the CPU does not perform the cleaning process, and returns to step S1.

Next, the cleaning process to clean the electric dust collector 100 will be described with reference to FIG. 10. First, the CPU judges whether or not a cleaning timer time stored in the RAM 410 of the microcomputer 200 is 0 (step S11). At the start of the cleaning of the electric dust collector 100, the timer time is set to be 10 minutes.

Then, the CPU judges whether or not the air conditioner is operating (step S12). If it is operating, the CPU decreases the operating frequency of the compressor motor M1 (step S13) to stop or reduce the number of rotations of the fan motor M2 (step S14). On the other hand, when it is not operating, the compressor motor M1 is stopped. Therefore, the CPU causes the fan motor M2 to continue its stop state or operates the fan motor M2 at a small number of rotations (step S14).

In this state, current is fed to the heater 140 (step S15). Thereafter, the time of the cleaning timer is decremented by a unit time, e.g., one (1) minute (step S16). The resultant timer time indicates a time to stop the current feeding to the heater 140.

Subsequently, the CPU judges whether or not the timer time is 0 (step S17). If it is not 0, the CPU returns to step S11, and repeats the sequence of procedural steps S11 to S18. On the other hand, if it is 0, the CPU stops the current feeding to the heater 140 (step S18), resets the data of operating time stored in the RAM 410 to 0 (step S19), and returns the in-cleaning flag to its original state (step S20).

Thereafter, the CPU returns to step S11. In this step, the CPU judges whether or not the timer time is 0. At this time, the timer time is 0. Therefore, the CPU sets a set value of the timer time in preparation for the cleaning of the electric dust collector 100 (step S21). In this instance, the set value is set to be 10 minutes as a time required to clean the electric dust collector 100. Here, the subroutine of FIG. 10 ends, and the CPU returns to the main routine of the FIG. 9 program.

As described above, when the operating time of the air conditioner exceeds 10 hours, the air conditioning operation is temporarily stopped and the operation of cleaning the electric dust collector 100 is performed for 10 minutes. In the cleaning operation, the dust particulate matter sticking to the dust collector electrode 120 of the electric dust collector 100 is burned by the heater 140, whereby the electric dust collector 100 is automatically cleaned. The electric dust collector 100 thus cleaned resumes its dust collecting function. When the cleaning process for the electric dust collector 100 ends, the air conditioning operation is started again.

When the heater 140 burns the dust particulate matter, smoke and offensive smell are given out. At this time, the fan motor M2 is not operated or its number of rotations is reduced. Therefore, the amounts of the smoke and smell are small to give the user little offensive feeling.

When the operating time of the air conditioner exceeds 8 hours, the air conditioning operation is not interrupted, but the electric dust collector 100 is cleaned after the air conditioning operation ends. When the user leaves the apparatus-equipped room immediately after the air conditioning operation of the air conditioner ends, it is suggestible that the user puts the stop signal in an on-state. By doing so, even if the operating time exceeds 8 hours, there is no chance that current is fed to the heater 140. Therefore, no anxiety is given to the user after leaving the room.

In the above-described embodiment, the time to clean the electric dust collector 100 is managed by use of the operating time of the air conditioner. Alternatively, an amount of air flowing through the electric dust collector 100 is detected, and the detected amounts are added up, and the added-up result is used for the cleaning time management.

To detect the amount of air flowing through the air passage of the air conditioner, a sensor may be used. However, this approach needs an increase of cost to manufacture. For this reason, it is preferable to detect the amount of air indirectly. For example, the amount of air flowing through the electric dust collector 100 is proportional to the number of rotations of the fan motor M2. Hence, the product of multiplying the number of rotations of the motor by the time of feeding current to the motor will be proportional to the added-up value of the amount of air flowing through the electric dust collector 100.

Further, the present invention is not limited to the above-described embodiment. For example, the heater for burning the dust particulate matter on the dust collector electrode may be located near to the electrode. The operating time of the air conditioner may be equal to the current feeding time of the electric dust collector. The control of the air conditioner is realized by the software technique, but may be realized by the hardware technique.

In the present invention, when the operating time of the apparatus exceeds the preset time, the heater is energized for a predetermined time to burn the dust particulate matter sticking onto the electrode of the electric dust collector. The electric dust collector can maintain a satisfactory dust collecting ability without a periodical cleaning of the electric dust collector. Elimination of the cleaning work provides an easy handling of the apparatus by the user.

Figure 11:
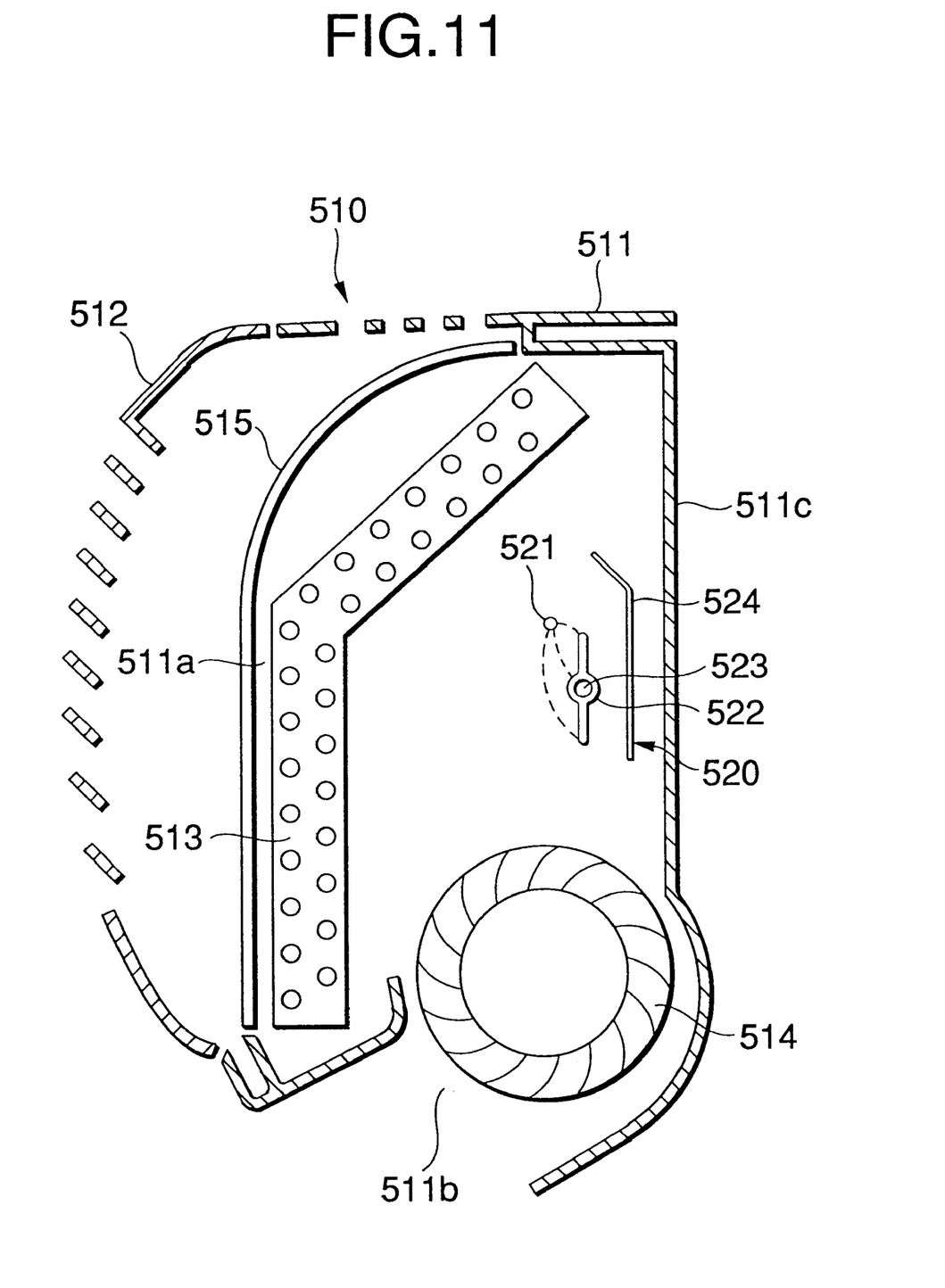
FIG. 11 is a side view showing an air conditioning apparatus, which is a further embodiment of the present invention.
Figure 12A:
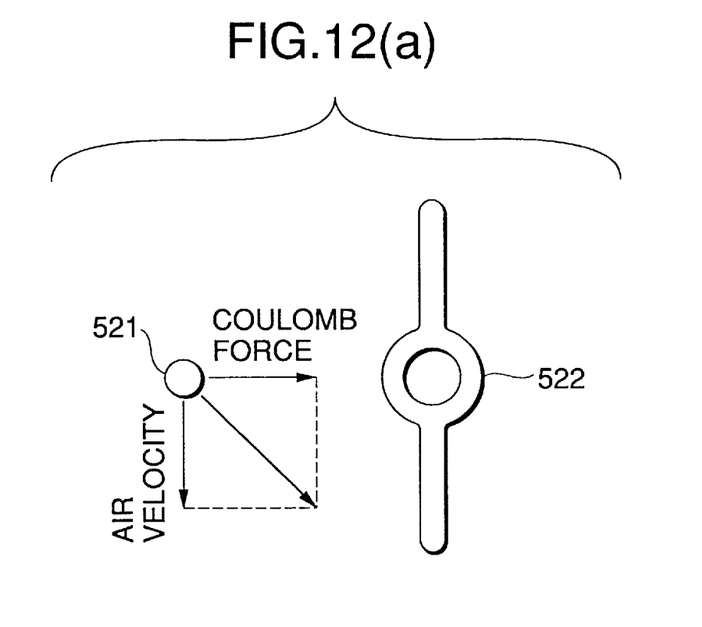
Figure 12B:
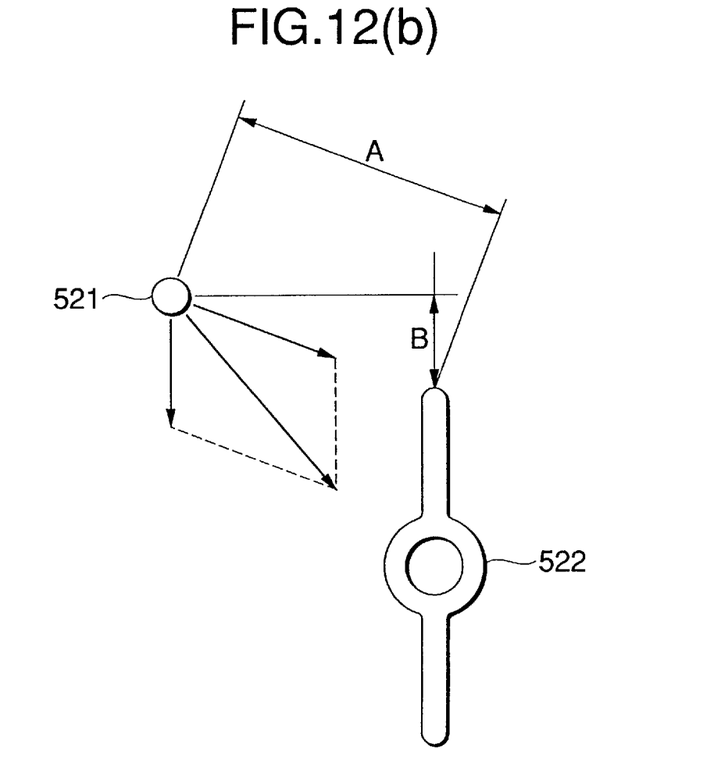

Next, an air conditioning apparatus, according to a further embodiment of the present invention, will be described with reference to FIGS. 11, 12(a) and 12(b). FIG. 11 is a side view showing the air conditioning apparatus. FIGS. 12(a) and 12(b) are diagrams for explaining the principle of sticking of ionized dust particles to the dust collector electrode. In those figures, reference numeral 510 designates an air conditioner body; 511, a casing; 511a, an air inlet; 511b, an air outlet; 511c, a back plate; 512, a front case; 513, a heat exchanger; 514, a fan; 515, a filter; 520, an air cleaning device; 521, a discharge electrode; 522, a dust collector electrode; 523, a heater; and 524, a heat shield plate.

The air conditioning apparatus to be described hereinafter is an air conditioner as shown in FIG. 11. The air conditioner is made up of the air conditioner body 510 for performing an air conditioning operation, and the ion type air cleaning device 520 incorporated into the air conditioner body 510 to add an air cleaning function. The air cleaning device 520 is disposed in the air passage on the rear side of the heat exchanger 513.

The air conditioner body 510 is made up of the casing 511, front case 512, heat exchanger 513, and fan 514. The casing 511 includes the air inlet 511a opened in the fore side thereof and the air outlet 511b formed below the air inlet 511a. The front case 512 is mounted on the air inlet 511a of the casing 511. The heat exchanger 513 is disposed within the casing 511 while being confronted with the air inlet 511a of the casing 511. The fan 514 is of the cross flow type, and located behind the air outlet 511b. The fan 514 causes air to forcibly flow from the air inlet 511a to the air outlet 511b by way of the heat exchanger 513. The filter 515 is disposed in front of the heat exchanger 513. A louver and a flap, which are used for changing the direction of the air stream discharged through the air outlet 511b, are not illustrated in the figures.

The air cleaning device 520 is integrally mounted on the surface of the vertical back plate 511c of the casing 511. The air cleaning device 520 is formed with the discharge electrode 521, dust collector electrode 522, heater 523, and heat shield plate 524. The discharge electrode 521, which is shaped linear, is horizontally stretched out. The dust collector electrode 522, which is shaped like a plate, is disposed in parallel with the discharge electrode 521. The heater 523, which is shaped like a bar, is horizontally disposed for cleaning the dust collector electrode 522. The heat shield plate 524, which is shaped like a plate, reduces the effects of the heat generated from the heater 523. The dust collector electrode 522 is horizontally supported by the heater 523, while sandwiching the heater 523 therebetween.

The air cleaning device 520 has such a unique structure that the discharge electrode 521 is located deviated to the windward of the air stream flowing through the air passage, not in front of the dust collector electrode 522. This structure will be described in detail later.

Next, the operation of the thus constructed air conditioning apparatus will be described. When the air conditioning apparatus is operated, the fan 514 is operated, and the indoor air is attracted into the casing 511 through the front panel, or the front case 512. When passing through the heat exchanger 513, the air is cooled or heated, and flows from the upper side to the lower side through the air passage, and is returned to the room, through the air outlet 511b.

When the air cleaning device 520 is operated, a high voltage is applied to between the discharge electrode 521 (positive) and the dust collector electrode 522 (negative). Under the high voltage, electric lines of force indicated by broken lines are developed between the discharge electrode and the dust collector electrode. The dust particles present around the discharge electrode 521 are ionized and attracted and stick to the dust collector electrode 522. As a result, the air emanating from the heat exchanger 513 is cleaned when it passes through the air passage on the rear side of the heat exchanger 513, and returns to the room.

As described above, the discharge electrode 521 is located deviated to the windward of the air stream flowing through the air passage, not in front of the dust collector electrode 522. Therefore, most of the ionized dust particles stick to the dust collector electrode 522 and others. This phenomenon will be described with reference to FIGS. 12(a) and 12(b).

FIG. 12(a) shows a case where the discharge electrode 521 is disposed in front of the dust collector electrode 522. In this case, the ionized dust particles approach to the dust collector electrode 522 by coulomb force. Further, the air is accelerated by the suction force by the fan 514 and its velocity is high. Therefore, most of the dust particles move and stick to the components near the air outlet 511b, for example, the louver and the flap (both being not shown) through the fan 514, while not sticking to the dust collector electrode 522.

FIG. 12(b) shows a case where the discharge electrode 521 is located deviated to the windward of the air stream from a location in front of the dust collector electrode 522. In this case, most of the ionized dust particles stick to the dust collector electrode 522 and others even if the air velocity is accelerated to be high by the suction force of the fan 514.

The discharge electrode 521 is located at such a position where a resultant vector obtained by composing the velocity of the air stream flowing in the vicinity of the discharge electrode 521 with the coulomb force acting on the dust collector electrode 522 is directed to the dust collector electrode 522. Thus, the moving direction of the ionized dust particles is coincident with the direction of the resultant vector obtained by composing the air velocity with the coulomb force. The dust collector electrode 522 lies on a prolongation from the direction of the resultant vector. Therefore, most of the ionized dust particles are attracted to the dust collector electrode 522. In this embodiment, a voltage of 13KV is applied to between the discharge electrode 521 and the dust collector electrode 522. Distances A and B in FIG. 12(b) are set as follows: A=14 mm and B=8 mm.

In the case of FIG. 12(a), the resultant vector obtained by composing the air velocity with the coulomb force is not directed to the dust collector electrode 522. Therefore, little amount of the ionized dust particles stick to the dust collector electrode 522 and others.

In the air conditioning apparatus of the present invention, little amount of the ionized dust particles stick to the components near the air outlet 511b, for example, the louver and the flap (both being not shown) through the fan 514. Therefore, the louver and the flap will appear little dirty. Further, there is little chance that dust lumps sticking to the inside of the casing 511 are stripped therefrom by a blow by the fan, and discharged outside through the air outlet, and float in the room.

Besides, the dust collector electrode 522 is heated by energizing the heater 523 to burn the dust particles sticking thereto, whereby the dust collector electrode 522 is cleaned. For this reason, an easy maintenance is secured even in the structure that the dust collector electrode 522 is located behind the heat exchanger 513. Thus, the performance of the air conditioning apparatus is improved.

The air cleaning device 520 is provided in the air passage on the rear side of the heat exchanger 513. The air flows mainly from the upper side to the lower side, and the structure including the plate-like dust collector electrode 522 and the heat shield plate 524 is arranged in the air flowing direction. Therefore, the air cleaning device 520 does not hinder the flow of air stream when the air conditioning apparatus is in an air conditioning mode. Thus, the degradation of the air conditioning function caused by provision of the air cleaning device 520 is avoided.

The present invention is not limited to the above-described embodiment. For example, the structures of the discharge electrode and the dust collector electrode are not limited to those described and illustrated.

In the present invention, the ionized dust particles are efficiently stick to the dust collector electrode and others. Little amount of the dust particles reach the air outlet of the casing. Therefore, there is little chance that the dust particles stick to the flap and the like, and the flap appears markedly dirty. Further, there is little chance that dust lumps sticking to the inside of the casing are stripped therefrom by a blow by the fan, and discharged outside through the air outlet, and float in the room. The apparatus performances are improved.

What is claimed is:

1. An air conditioning apparatus with an electric dust collector, which develops a coulomb force between a discharge electrode and a dust collector electrode disposed in an air passage, and ionizes dust particles contained in air flowing through the air passage to cause the ionized dust particles to stick to the dust collector electrode by the coulomb force, including a heat shield plate for shielding heat arrayed substantially parallel to streams of air flowing through the air passage, wherein the discharge electrode is located deviated to windward of the streams of air flowing through the air passage.

2. The air conditioning apparatus according to claim 1, wherein the discharge electrode is located such that a resultant vector obtained by composing a velocity of air flowing around the discharge electrode with a coulomb force acting on the dust collector electrode is directed to the dust collector electrode.

* * * * *